US012164406B2

(12) United States Patent
Hussain et al.

(10) Patent No.: US 12,164,406 B2
(45) Date of Patent: Dec. 10, 2024

(54) ERROR HANDLING RECOMMENDATION ENGINE

(71) Applicant: Capital One Services, LLC, McLean, VA (US)

(72) Inventors: Syed Hussain, Little Elm, TX (US); Milind Patel, Frisco, TX (US); Briana Vargas, Arlington, VA (US); Tomas Anthony, Frisco, TX (US); James Howe, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 232 days.

(21) Appl. No.: 17/581,321

(22) Filed: Jan. 21, 2022

(65) Prior Publication Data

US 2023/0236944 A1 Jul. 27, 2023

(51) Int. Cl.

| | |
|---|---|
| ***G06F 11/36*** | (2006.01) |
| ***G06F 8/41*** | (2018.01) |
| ***G06F 11/07*** | (2006.01) |
| ***G06F 11/30*** | (2006.01) |
| ***G06F 11/32*** | (2006.01) |
| ***G06F 18/214*** | (2023.01) |
| ***G06N 20/00*** | (2019.01) |

(52) U.S. Cl.
CPC .............. *G06F 11/327* (2013.01); *G06F 8/41* (2013.01); *G06F 11/0772* (2013.01); *G06F 11/302* (2013.01); *G06F 18/214* (2023.01); *G06N 20/00* (2019.01)

(58) Field of Classification Search
CPC ................. G06F 8/41; G06F 8/43; G06F 8/65
See application file for complete search history.

(56) References Cited

U.S. PATENT DOCUMENTS

2018/0307582 A1* 10/2018 Vikjord ................. G06F 11/362
2021/0056006 A1* 2/2021 Mahajan ................. G06F 8/427
2021/0216939 A1* 7/2021 Digrazia ................... G06F 8/36

* cited by examiner

*Primary Examiner* — Duy Khuong T Nguyen
(74) *Attorney, Agent, or Firm* — Foley & Lardner LLP

(57) ABSTRACT

Systems and methods are disclosed herein for recommending solutions to execution errors of software packages. An error message related to compilation or execution of computer code is received and, based on a vector representation of the error message and vector representations corresponding to message threads from one or more collaborative messaging systems, a set of message threads that match the error message is identified. Furthermore, a known error message that matches the set of message threads is identified and updated computer code is generated based on the known error message. The updated computer code is then provided to a client device.

19 Claims, 7 Drawing Sheets

500

200

203 206

| *System/Channel* | *Identifier* |
|---|---|
| *S1-C1* | *B19LU7CAA* |
| *S1-C2* | *B19LU7CCA* |
| *S1-C3* | *B19LU7CXA* |
| *S2-C1* | *T16567U7C_A2A* |
| *S2-C1* | *T16567U7C_A2B* |

| *Message Thread* | *Match* |
|---|---|
| *ABCDE123* | *.2* |
| *ABCDE145* | *.3* |
| *ABCDE156* | *.9* |
| *ABCDE167* | *.3* |
| *ABCDE988* | *.2* |

| Known Error Message | Vector Representation | Solution Code |
|---|---|---|
| <Error Text 1> | Vector 1 | Code 1 |
| <Error Text 2> | Vector 2 | Code 2 |
| <Error Text 3> | Vector 3 | Code 3 |
| <Error Text 4> | Vector 4 | Code 4 |
| <Error Text 5> | Vector 5 | Code 5 |

FIG. 5

ERROR HANDLING RECOMMENDATION ENGINE

BACKGROUND

Software troubleshooting can be a difficult and time-intensive process. In many instances, troubleshooting instructions for widely available software packages may be found on the Internet, from the provider of the software, or at another easily accessible location. However, for software packages that are proprietary, for example, to a particular enterprise, finding solutions to errors may involve reading messages and responses on various collaborative messaging systems (e.g., Slack®), which may be extremely time consuming. In some instances, users executing software packaging may not know which collaborative messaging systems to search and/or which messaging channels on those systems to search. In other instances, users may not have access to those systems and/or channels. As a result, finding solutions to software execution issues in these environments may be extremely difficult or may be even impossible.

SUMMARY

Therefore, methods and systems are described herein for recommending solutions to execution errors of software packages. For example, an error handling recommendation engine may be used to perform the actions for recommending solutions to execution errors of software packages. The error handling recommendation engine may receive an error message related to compilation or execution of computer code. The computer code may be stored in an execution file and may be compiled or executed from a development environment (e.g., GitHub®). When the computer code is being compiled or executed, the system may generate an error message and the error message may be delivered to the error handling recommendation engine using an outbound webhook.

In some embodiments, the error handling recommendation engine may retrieve, from one or more channels of one or more collaborative messaging systems, a plurality of message threads. For example, an enterprise may host one or more collaborative messaging systems, including chat platforms. Those may include Slack®, Microsoft Teams®, etc. The error handling recommendation engine may use a corresponding Application Programming Interface (API) for the one or more collaborative messaging systems to retrieve message threads from those collaborative messaging systems. The message threads may include a request/inquiry and associated responses, including, in some cases, instructions on how to fix certain errors. When the message threads are received, the error handling recommendation engine may generate vector representations for each message thread. Those vector representations may be stored within a vector space. In some embodiments, the vector representations may be embeddings.

The error handling recommendation engine may generate a vector representation of the error message. The error handling recommendation engine may then determine, based on the vector representation of the error message and the plurality of vector representations corresponding to the plurality of message threads, a set of message threads that match the error message. In some embodiments, to make the determination, the error handling recommendation engine may use a machine learning model that is trained to output a degree to which two vector representations match. For example, the machine learning model may receive an input that includes each vector representation for each message thread and the vector associated with the error message. The machine learning model may output a value for each vector representation associated with each message thread indicating a degree to which the two vector representations match. The error handling recommendation engine may then select one or more message threads that match the error message.

The error handling recommendation engine may then determine a known error message that matches the set of message threads. For example, the error handling recommendation engine may store vector representations of known error messages. Thus, the error handling recommendation engine may compare those vector representations with the vector representations of the message threads to determine whether there is a match. In some embodiments, the error handling recommendation engine may use a machine learning model to determine a degree of similarity between the vector representations. Based on the comparison, the error handling recommendation engine may identify a known error message that best matches one or more message threads.

When a match is found, the error handling recommendation engine may retrieve a solution computer code for fixing the known error message and generate an updated computer code based on the computer code and the solution computer code. For example, the error handling recommendation engine may store a set of instructions that, when executed on an electronic file storing the computer code, would generate updated computer code that fixes the issue. The error handling recommendation engine may then provide the updated computer code to a client device.

In some embodiments, the error handling recommendation engine may not be able to find a matching known error message for the message threads. In those embodiments, the error handling recommendation engine may output one or more links to the message threads for the user to review. In some embodiments, the error handling recommendation engine may update the machine learning model based on whether the updated computer code fixes the issue. For example, the error handling recommendation engine may compile or execute the updated code and determine whether the same or a different error message is received. If the same error message is received, the error handling recommendation engine may determine that the fix does not apply to the error message and may train the machine learning model based on that data (e.g., input the error message, the fix, and the label that the fix did not work into a training algorithm of the machine learning model). If no error is returned, the error handling recommendation engine may train the machine learning model based on that information. If a different error is returned, the error handling recommendation engine may train the machine learning model accordingly.

In some embodiments, the error handling recommendation engine may perform a test on the updated code. Thus, the error handling recommendation engine may initiate compilation or execution of the updated computer code (e.g., test the updated computer code). In response to determining that there are no error messages, the error handling recommendation engine may provide the updated computer code to a user device.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates a data structure for storing collaborative systems/channels and corresponding channel identifiers, in accordance with one or more embodiments of this disclosure.

FIG. 3 illustrates a data structure for storing message threads and corresponding values representing a degree to which each message thread matches the error message, in accordance with one or more embodiments of this disclosure.

FIG. 5 illustrates a table that may store known error messages, in accordance with one or more embodiments of this disclosure.

DETAILED DESCRIPTION OF THE DRAWINGS

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
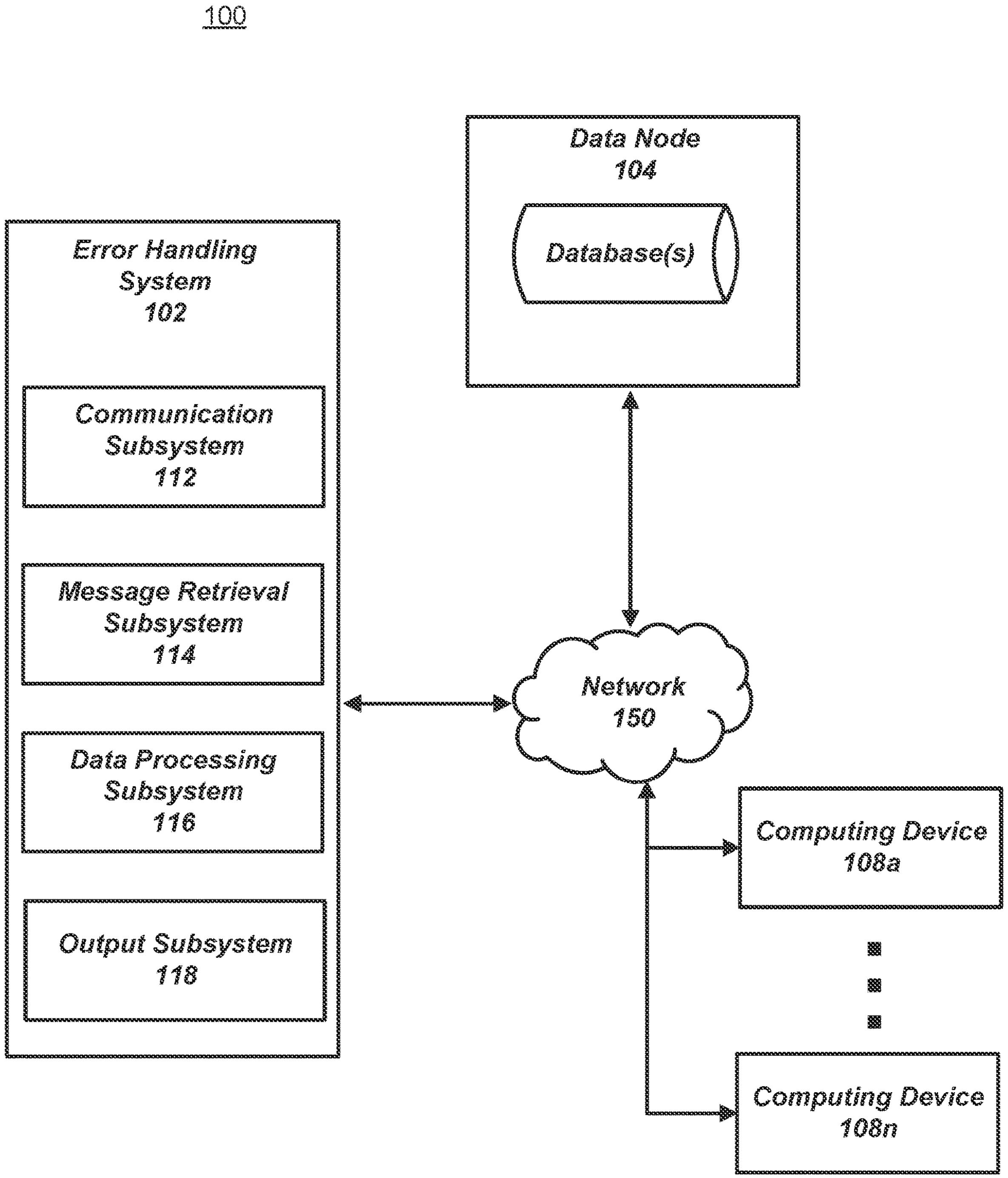
FIG. 1 shows an illustrative system for recommending solutions to compilation or execution errors of software packages, in accordance with one or more embodiments of this disclosure.

FIG. 1 is an example of environment 100 for recommending solutions to execution errors of software packages. Environment 100 includes error handling system 102, data node 104, and computing devices 108*a*-108*n*. Error handling system 102 may execute instructions for recommending solutions to execution errors of software packages. Error handling system 102 may include software, hardware, or a combination of the two. For example, error handling system 102 may be a physical server or a virtual server that is running on a physical computer system. In some embodiments, error handling system 102 may be a user device or may be similar in hardware/software configuration to computing devices 108*a*-108*n*.

Data node 104 may store various data, including one or more machine learning models, training data, collaborative messaging system data, and/or other suitable data. In some embodiments, data node 104 may also be used to train the machine learning model. Data node 104 may include software, hardware, or a combination of the two. For example, data node 104 may be a physical server, or a virtual server that is running on a physical computer system. In some embodiments, error handling system 102 and data node 104 may reside on the same hardware and/or the same virtual server/computing device. Network 150 may be a local area network, a wide area network (e.g., the Internet), or a combination of the two. Computing devices 108*a*-108*n* may be end-user computing devices (e.g., desktop computers, laptops, electronic tablets, smart phones, and/or other computing devices used by end users).

Error handling system 102 may receive an error message associated with an execution of computer code. Error handling system 102 may receive the error message using communication subsystem 112. Communication subsystem 112 may include software components, hardware components, or a combination of both. For example, communication subsystem 112 may include a network card (e.g., a wireless network card and/or a wired network card) that is coupled with software to drive the card. In some embodiments, communication subsystem 112 may receive the error message from data node 104 or from another computing device. In some embodiments, the error message may include textual data generated during execution of the computer code. The textual data may be passed in a data structure and/or a byte stream. In some embodiments, the textual data may be received as a structure error file (e.g., an XML file or another suitably formatted file). Communication subsystem 112 may pass the error message, or a pointer to the error message in memory, to message retrieval subsystem 114.

Message retrieval subsystem 114 may include software components, hardware components, or a combination of both. For example, message retrieval subsystem 114 may include software components (e.g., API calls) that access one or more collaborative messaging systems. In some embodiments, message retrieval subsystem 114 may retrieve, from one or more channels of one or more collaborative messaging systems, a plurality of message threads. For example, message retrieval subsystem 114 may have access to various collaborative messaging systems (e.g., Slack®, Microsoft Teams®, etc.) that are available within an enterprise (e.g., within a corporation). Those collaborative messaging systems may be different and may be used by different departments of the enterprise. Furthermore, those collaborative messaging systems may have different channels that may be accessed by message retrieval subsystem 114. Thus, it should be noted that a particular user executing computer code may not be able to access all those collaborative messaging systems/channels. However, message retrieval subsystem 114 may have access to all those systems/channels and may have proper API calls built in for access.

FIG. 2 illustrates a data structure (e.g., a table) 200 that may be stored which includes column 203 that stores collaborative messaging systems and channels and column 206 that stores an identifier of the corresponding collaborative messaging system/channel. Thus, message retrieval subsystem 114 may retrieve/receive one or more channel identifiers corresponding to one or more messaging channels associated with one or more collaborative messaging systems. Message retrieval subsystem 114 may then use the channel identifiers to query the one or more messaging channels for message thread data.

In some embodiments, data structure 200 may be updated. For example, new collaborative messaging systems and/or new channels may be added to data structure 200 to be accessed. In some embodiments, when a new collaborative messaging system is added, a new API may be added to the system to access that new collaborative messaging system. In some embodiments, new channels may be added to the system automatically. For example, message retrieval subsystem 114 may scan each collaborative message system periodically (e.g., each hour, each day, each week, etc.) to determine whether new messaging channels have been added to the system. When new messaging channels are found, message retrieval subsystem 114 may add those channels to data structure 200.

In some embodiments, message retrieval subsystem 114 may retrieve one or more channel identifiers corresponding to the one or more messaging channels associated with the one or more collaborative messaging systems. For example, message retrieval subsystem 114 may access data structure 200 to retrieve the messaging channels. Message retrieval subsystem 114 may then generate queries for message threads using those collaborative messaging system/channel identifiers and transmit those queries (e.g., via communication subsystem 112) to the appropriate collaborative messaging system. Thus, message retrieval subsystem 114 may query, using the one or more channel identifiers, the one or more channels for message threads. In response, message retrieval subsystem 114 may receive, from the one or more channels, the plurality of message threads. Each thread may be stored in its own data structure. For example, XML data structure may be used for each thread. That is, message retrieval subsystem 114 may receive, from each collaboration messaging system, one or more XML files (e.g., an XML file per message channel) containing the message threads.

In some embodiments, message retrieval subsystem 114 generates a vector representation for each message thread. The vector representations may be generated using a machine learning algorithm that changes textual data into numerical data (e.g., based on how many times certain words appear in the textual data). The vector representations of the threads may be stored as part of a vector space. For example, a vector space may be a storage location that can be queried for a vector that corresponds to a particular message thread. In some embodiments, a vector space may be a database or a database table that stores message threads (e.g., via message thread identifiers and associated vector representations). In some embodiments, the vector representations may be generated using embedding techniques that enable translation of high-dimensional vectors into relatively low-dimensional space. For example, each word within a message thread may be mapped to a vector representing that word. Thus, each vector representation may have one, two, three, or N dimensions corresponding. Words with similar meanings may be mapped to vectors of similar values. In some embodiments, the vector representations may be generated using contextual embeddings techniques, where words are mapped to vectors in such a way where contextual information (other words within the vicinity of a given word) may change the vector representation of the word.

Error handling system 102 may also include data processing subsystem 116. Data processing subsystem 116 may include software components, hardware components, or a combination of both. For example, data processing subsystem 116 may include software components that access data in memory and/or storage, and may use one or more processors to perform its operations. Data processing subsystem 116 may determine, based on a vector representation of the error message and a plurality of vector representations corresponding to a plurality of message threads retrieved from the one or more collaborative messaging systems, a set of message threads that match the error message. Data processing subsystem 116 may perform the determination using various methods.

In some embodiments, the determination operation may be performed using a machine learning model. In particular, data processing subsystem 116 may input the vector representation of the error message and each of the plurality of vector representations into a machine learning model. The machine learning model may be trained to output a degree to which two vector representations match. Thus, in some embodiments, the machine learning model may perform a pair-wise comparison of vector representations. For example, data processing subsystem 116 may input the vector representation of the error message and a vector representation for one of the message threads into the machine learning model and receive a similarity value between the two vector representations. Data processing subsystem 116 may perform this operation with vector representations of all the message threads to determine corresponding similarity values. Thus, data processing subsystem 116 may receive, from the machine learning model, for the plurality of vector representations, a plurality of values. Each value may indicate a degree to which a corresponding vector representation of the plurality of vector representations matches the vector representation associated with the error message.

In some embodiments, the machine learning model may include a cosine similarity function to perform the comparison. In some embodiments, the cosine similarity function may be used outside of the machine learning model to perform the comparison. As a result of vector comparison, data processing subsystem 116 may build table 300 of FIG. 3. Table 300 may include column 303 that stores a message thread identifier and column 306 that stores a degree of match between the corresponding message thread and the error message. As illustrated in FIG. 3, message thread 309 has a highest degree of match. Thus, data processing subsystem 116 may select one or more vector representations based on output of the machine learning model. For example, data processing subsystem 116 may select a message thread with the highest matching value. In some embodiments, data processing subsystem 116 may select multiple message threads (e.g., 3, 5, etc.). In some embodiments, data processing subsystem 116 may select message threads with a matching value above certain threshold (e.g., 0.5, 0.7, 0.9, etc.).

In some embodiments, data processing subsystem 116 may cluster the message threads and generate a vector representation representative of each cluster of message threads. Thus, data processing subsystem 116 may perform a vector similarity comparison between the vector representation corresponding to the error message and the vector representation corresponding to the cluster of message threads. Thus, in some embodiments, data processing subsystem 116, through output subsystem 118, may provide one or more matching message threads or links to those message threads to a client device.

Figure 4:
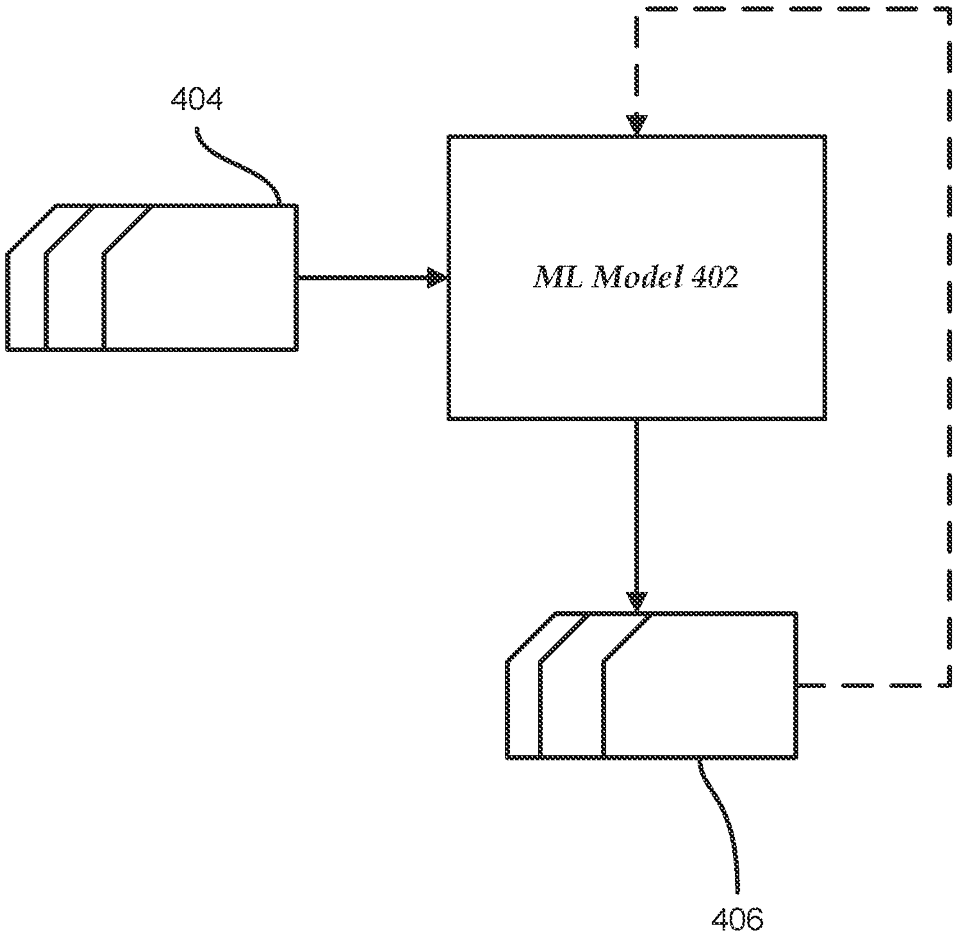
FIG. 4 illustrates an exemplary machine learning model, in accordance with one or more embodiments of this disclosure.

FIG. 4 illustrates an exemplary machine learning model. Machine learning model 402 may take input 404 (e.g., vector representations as described above) and may output a degree of match or similarity value associated with the two vector representations. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, data processing subsystem 116 may determine a known error message that matches the set of message threads. Data processing subsystem 116 may perform the determination using a number of mechanisms. For example, data processing subsystem 116 may compare textual data of each message thread in the set of message threads with existing textual data associated with a plurality of known error messages. If a certain portion of the text of known error messages matches the text associated with a particular message thread, a match may be found.

The textual comparison may be performed through string comparison, for example. In some embodiments, the comparison may be performed using vector representations as described above. Each known error message may have an associated vector representation and/or the corresponding text of the error message. FIG. 5 illustrates a table 500 that may store known error messages. Column 503 stores known error messages in the form of error text. Column 505 stores corresponding vector representations and column 507 stores solution code corresponding to each known error message. Thus, data processing subsystem 116 may determine, based on the comparing, the known error message that matches the set of message threads.

In some embodiments, comparing textual data may be performed through comparing vector representations. Thus, data processing subsystem 116 may generate a corresponding vector representation for each message thread. Data processing subsystem 116 may execute a comparison between each corresponding vector representation and vector representations corresponding to the plurality of known error messages. For example, data processing subsystem 116 may use a machine learning model as described above, and/or use a cosine similarity algorithm. It should be noted that other algorithms for determining similarity between two vectors may be used.

In some embodiments, there may be more than one message thread in the set of message threads. In those embodiments, data processing subsystem 116 may perform the comparison against each thread and select the known error message that best matches one of the threads. For example, data processing subsystem 116 may compare the textual data of each thread with textual data of each known error message. If, for example, thread one has a 90% match to a particular known error message and thread two has a 30% match to another known error message, data processing subsystem 116 may select thread one as matching the particular known error message. In some embodiments, data processing subsystem 116 may perform both a vector comparison and an error message text comparison and select the appropriate known error message based on the combination. Data processing subsystem 116 may calculate a weighted average of the two comparisons to determine which known error message best matches a particular message thread. In some embodiments, data processing subsystem 116 may compare the best match value to a threshold to determine where there is a match. For example, if the threshold is 90% and the match value is 20%, then data processing subsystem 116 may determine that there is no match and may provide the set of message threads to the user (e.g., via output subsystem 118).

When a known error message is determined, data processing subsystem 116 may retrieve solution computer code for fixing the known error message. For example, if row 509 of FIG. 5 includes the data for the known error message, data processing subsystem 116 may retrieve "Code 2" illustrated to be the same row. The solution computer code may comprise instructions to update the original computer code to fix the error message. Thus, data processing subsystem 116 may generate updated computer code based on the computer code and the solution computer code. For example, data processing subsystem 116 may determine that the solution computer code provides an instruction to remove a first portion of the computer code. The first portion of the computer code may be a path to a particular file that should be removed to fix the error indicated in the error message. Thus, data processing subsystem 116 may remove the first code portion of the computer code.

In some embodiments, data processing subsystem 116 (e.g., via the solution computer code) may determine that the solution computer code provides an instruction to update a first variable within the computer code. For example, a particular variable may be set incorrectly for execution or compilation of the computer code. Thus, data processing subsystem 116 may update that first variable. When the solution computer code is finished executing, data processing subsystem 116 may save the updated computer code. When data processing subsystem 116 updates the computer code, the updated computer code may be passed to output subsystem 118.

Output subsystem 118 may include software components, hardware components, or a combination of both. For example, output subsystem 118 may include software components that access data in memory and/or storage, and may use one or more processors to perform its operations. Output subsystem 118 may output the updated computer code to one or more computing devices 108*a*-108*n* and/or to data node 104. In some embodiments, output subsystem 118 may transmit the updated computer code or a link to the updated computer code over an electronic mail (e-mail) or over another electronic communication method.

In some embodiments, data processing subsystem 116 may be involved in training the machine learning model described above. Thus, data processing subsystem 116 may provide a prompt to the client device asking whether the updated computer code corrected the error message. The prompt may be in a form of a pop-up, an electronic message, or in another suitable form. The prompt may include a "Yes" response and a "No" response as options, enabling the user to let the system know whether the updated computer code has fixed the issue. Based on a response to the prompt indicating that the updated computer code corrected the error message, data processing subsystem 116 may train the machine learning model using the error message and the known error message. For example, data processing subsystem 116 may invoke a training algorithm for the machine learning model and input an identifier associated with the updated computer code (or the update computer code) and the error message identifier (or the error message itself) with a success label into the training algorithm.

In some embodiments, data processing subsystem 116 may test the updated computer code and update the machine learning model based on the testing. Data processing subsystem 116 may determine, based on executing the updated computer code, whether the error message is received. Data processing subsystem 116 may execute the update computer code (or compile the updated computer code) and determine whether the error message is received or whether a different error message is received. Based on determining that the error message is not received, data processing subsystem 116 may assign a first label to the updated computer code (e.g., a success label). Thus, the updated computer code may be combined with metadata for training the machine learning model. Based on determining that the error message is received, data processing subsystem 116 may assign a second label to the updated computer code (e.g., a failure label). It should be noted that if a different error message is detected, the failure label may be assigned with other metadata, for example, including the new error message. Data processing subsystem 116 may train the machine learning model using the error message, the known error message, and the first or the second label.

Computing Environment

Figure 6:
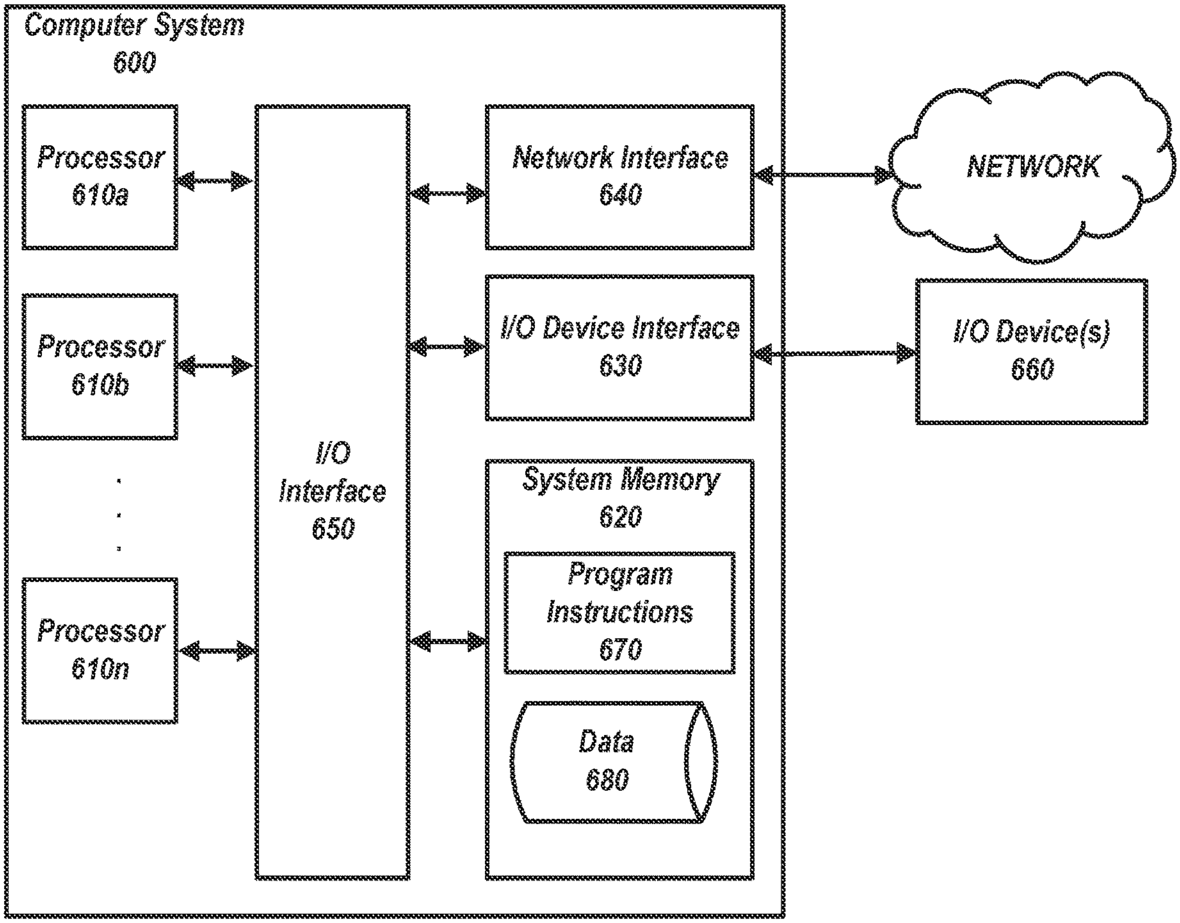
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
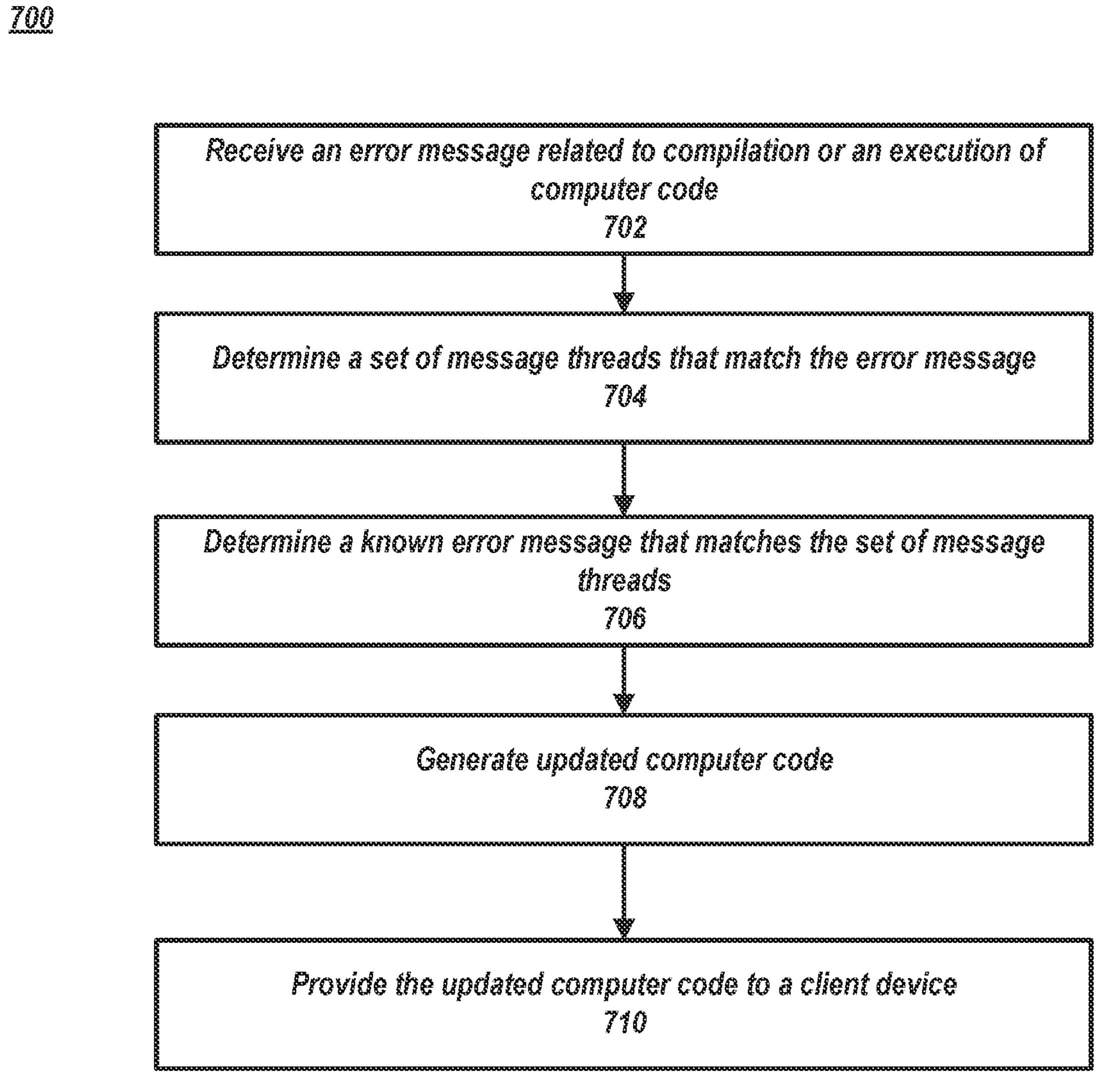
FIG. 7 is a flowchart of operations for recommending solutions to execution errors of software packages, in accordance with one or more embodiments of this disclosure.

FIG. 7 is a flowchart 700 of operations for improving documents. The operations of FIG. 7 may use components described in relation to FIG. 6. In some embodiments, error handling system 102 may include one or more components of computer system 600. At 702, error handling system 102 receives an error message related to compilation or execution of computer code. For example, the error handling system may receive the error message from data node 104 or from one of computing devices 108*a*-108*n*. Error handling system 102 may receive the error message over network 150 using network interface 640.

At 704, error handling system 102 determines a set of message threads that match the error message. For example, error handling system 102 may perform operations described above to make the determination. Error handling system 102 may use one or more processors 610*a*, 610*b*, and/or 610*n* to perform the determination. At 706, error handling system 102 determines a known error message that matches the set of message threads. For example, error handling system 102 may use one or more processors 610*a*-610*n* to perform the determination.

At 708, error handling system 102 generates updated computer code. Error handling system 102 may generate the updated computer code using one or more processors 610*a*, 610*b*, and/or 610*n* and store that code in system memory 620 (e.g., as part of data 680). At 710, error handling system 102 provides the updated computer code to a client device. Error handling system 102 may provide the updated computer code (e.g., using network interface 640) to, for example, one or more of computing devices 108*a*-108*n*. In some embodiments, error handling system 102 may provide the updated computer code to data node 104.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving an error message related to compilation or execution of computer code; determining, based on a vector representation of the error message and a plurality of vector representations corresponding to a plurality of message threads from one or more collaborative messaging systems, a set of message threads that match the error message; determining a known error message that matches the set of message threads; retrieving solution computer code for fixing the known error message; generating updated computer code based on the computer code and the solution computer code; and providing the updated computer code to a client device.

2. Any of the preceding embodiments, further comprising: providing a prompt to the client device asking whether the updated computer code corrected the error message; and based on a response to the prompt indicating that the updated computer code corrected the error message, training the machine learning model using the error message and the known error message.

3. Any of the preceding embodiments, further comprising: determining, based on executing the updated computer code, whether the error message is received; based on determining that the error message is not received, assigning a first label to the updated computer code; based on determining that the error message is received, assigning a second label to the updated computer code; and training the machine learning model using the error message, the known error message, and the first or the second label.

4. Any of the preceding embodiments, wherein determining the set of message threads that matches the error message comprises: inputting the vector representation of the error message and each of the plurality of vector representations into a machine learning model, wherein the machine learning model is trained to output a degree to which two vector representations match; receiving, from the machine learning model, for the plurality of vector representations a plurality of values, wherein each value indicates a degree to which a corresponding vector representation of the plurality of vector representations matches the vector representation associated with the error message; and selecting one or more vector representations based on output of the machine learning model.

5. Any of the preceding embodiments, wherein generating the updated computer code based on the computer code and the solution computer code comprises: determining that the solution computer code provides an instruction to remove a first portion of the computer code; removing the first portion of the computer code; determining that the solution computer code provides an instruction to update a first variable within the computer code; and updating the first variable and saving the updated computer code.

6. Any of the proceeding embodiments, further comprising: receiving one or more channel identifiers corresponding to one or more messaging channels associated with the one or more collaborative messaging systems; querying, using the one or more channel identifiers, the one or more channels; and receiving, from the one or more channels, the plurality of message threads.

7. Any of the preceding embodiments, wherein determining the known error message that matches the set of message threads comprises: comparing textual data of each message thread in the set of message threads with existing textual data associated with a plurality of known error messages; and determining, based on the comparing, the known error message that matches the set of message threads.

8. Any of the preceding embodiments, wherein comparing the textual data of each thread in the set of message threads with the existing textual data associated with a plurality of known error messages comprises: generating a corresponding vector representation for each message thread; and executing a comparison between each corresponding vector representation and vector representations corresponding to the plurality of known error messages.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for automated generation of updated computer code for software execution errors using a vector space representing error data extracted from one or more chat platforms, the system comprising:

one or more processors and media storing instructions, wherein the one or more processors execute the instructions to perform operations comprising:

generating, using a machine learning model, a plurality of embeddings representing a plurality of message threads extracted from one or more chat platforms, wherein the plurality of embeddings comprise low-dimensional representations of the plurality of message threads;

responsive to receiving an error message resulting from compilation or execution of computer code of a software package, generating, using the machine learning model, an error message embedding representing the error message;

determining, using the machine learning model, a set of embeddings from the plurality of embeddings that match the error message embedding, wherein each embedding of the set of embeddings represents a message thread that matches the error message, and wherein each embedding of the set of embeddings is selected based on a matching value being greater than a threshold matching value, the matching value indicating a degree of similarity between a message thread and the error message;

determining, based on the set of embeddings matching a known error message embedding representing a known error message, solution computer code for fixing the known error message; and generating and providing, to a client device, updated computer code based on the computer code of the software package and the solution computer code, wherein compilation or execution of the updated computer code avoids the error message.

2. The system of claim 1, wherein the operations further comprise:

providing a prompt to the client device to provide feedback regarding the updated computer code correcting the error message; and based on a response to the prompt indicating that the updated computer code corrected the error message, training the machine learning model using the error message embedding and the known error message embedding to identify that the error message matches the known error message.

3. The system of claim 1, wherein generating the updated computer code comprises:

determining that the solution computer code provides an instruction to remove a first portion of the computer code;

removing the first portion of the computer code;

determining that the solution computer code provides an instruction to update a first variable within the computer code; and updating the first variable and saving the updated computer code.

4. A method comprising:

receiving an error message related to compilation or execution of computer code;

generating a vector representation of the error message using a machine learning model;

determining a set of message threads that match the error message, wherein a degree of similarity is computed between the vector representation of the error message and a vector representation of each message thread of a plurality of message threads obtained from a collaborative messaging system, and the set of message threads are selected from the plurality of message threads based on the vector representation of each message thread of the set of message threads being greater than a threshold degree of similarity;

determining, based on the set of message threads, a known error message that matches the set of message threads;

retrieving solution computer code for fixing the known error message;

generating updated computer code based on the computer code and the solution computer code; and providing the updated computer code to a client device.

5. The method of claim 4, further comprising:

providing a prompt to the client device for feedback related to the updated computer code correcting the error message; and based on a response to the prompt indicating that the updated computer code corrected the error message, training the machine learning model using the vector representation of the error message and a vector representation of the known error message to identify that the error message matches the known error message.

6. The method of claim 4, further comprising:

determining, based on the updated computer code being executed, that the error message is received or avoided;

based on the error message being avoided, assigning a first label to the updated computer code;

based on the error message is received, assigning a second label to the updated computer code; and training the machine learning model using (i) the error message, the known error message, and the first label or (ii) the error message, the known error message, and the second label.

7. The method of claim 4, further comprising:

generating, using the machine learning model, plurality of vector representations representing the plurality of message threads;

computing a plurality of values indicating the degree to which a corresponding vector representation of the plurality of vector representations matches the vector representation associated with the error message; and selecting one or more vector representations from the plurality of vector representations based on the plurality of values, wherein the set of message threads comprises a message thread for each of the one or more vector representations.

8. The method of claim 4, wherein generating the updated computer code based on the computer code and the solution computer code comprises:

determining that the solution computer code provides an instruction to remove a first portion of the computer code;

removing the first portion of the computer code;

determining that the solution computer code provides an instruction to update a first variable within the computer code; and updating the first variable and saving the updated computer code.

9. The method of claim 4, further comprising:

receiving one or more channel identifiers corresponding to one or more messaging channels associated with the collaborative messaging system;

querying, using the one or more channel identifiers, the one or more messaging channels; and receiving and storing, from the one or more messaging channels, the plurality of message threads.

10. The method of claim 4, wherein determining the known error message that matches the set of message threads comprises:

comparing textual data of each message thread in the set of message threads with existing textual data associated with a plurality of known error messages; and determining, based on the comparing, the known error message that matches the set of message threads.

11. The method of claim 10, wherein comparing the textual data of each message thread in the set of message threads with the existing textual data associated with the plurality of known error messages comprises:

generating a corresponding vector representation for each message thread; and executing a comparison between each corresponding vector representation and vector representations corresponding to the plurality of known error messages.

12. One or more non-transitory, computer-readable media storing instructions that, when executed by one or more processors, cause the one or more processors to perform operations comprising:

receiving an error message related to compilation or execution of computer code;

determining a set of message threads that match the error message, wherein a degree of similarity is computed between a vector representation of the error message and a vector representation of each message thread of a plurality of message threads generated using a machine learning model, the plurality of message threads being obtained from a collaborative messaging system, and the set of message threads being selected from the plurality of message threads based on the vector representation of each message thread of the set of message threads being greater than a threshold degree of similarity;

determining, based on the set of message threads, a known error message that matches the set of message threads;

retrieving solution computer code for fixing the known error message;

generating updated computer code based on the computer code and the solution computer code; and providing the updated computer code to a client device.

13. The one or more non-transitory, computer-readable media of claim 12, wherein the operations further comprise:

providing a prompt to the client device for feedback related to the updated computer code correcting the error message; and based on a response to the prompt indicating that the updated computer code corrected the error message, training the machine learning model using the vector representation of the error message and a vector representation of the known error message to identify that the error message matches the known error message.

14. The one or more non-transitory, computer-readable media of claim 12, wherein the operations further comprise:

determining, based on the updated computer code being executed, that the error message is received or avoided;

based on the error message being avoided, assigning a first label to the updated computer code;

based on the error message is received, assigning a second label to the updated computer code; and training the machine learning model using (i) the error message, the known error message, and the first label or (ii) the error message, the known error message, and the second label.

15. The one or more non-transitory, computer-readable media of claim 12, wherein the operations further comprise:

generating, using the machine learning model, plurality of vector representations representing the plurality of message threads;

computing a plurality of values indicating the degree to which a corresponding vector representation of the plurality of vector representations matches the vector representation associated with the error message; and selecting one or more vector representations from the plurality of vector representations based on the plurality of values, wherein the set of message threads comprises a message thread for each of the one or more vector representations.

16. The one or more non-transitory, computer-readable media of claim 12, wherein generating the updated computer code based on the computer code and the solution computer code comprise:

determining that the solution computer code provides an instruction to remove a first portion of the computer code;

removing the first portion of the computer code;

determining that the solution computer code provides an instruction to update a first variable within the computer code; and updating the first variable and saving the updated computer code.

17. The one or more non-transitory, computer-readable media of claim 12, wherein the operations further comprise:

receiving one or more channel identifiers corresponding to one or more messaging channels associated with the collaborative messaging system;

querying, using the one or more channel identifiers, the one or more messaging channels; and receiving, from the one or more messaging channels, the plurality of message threads.

18. The one or more non-transitory, computer-readable media of claim 12, wherein determining the known error message that matches the set of message threads comprises:

comparing textual data of each message thread in the set of message threads with existing textual data associated with a plurality of known error messages; and determining, based on the comparing, the known error message that matches the set of message threads.

19. The one or more non-transitory, computer-readable media of claim 18, wherein the instructions for comparing the textual data of each thread in the set of message threads with the existing textual data associated with a plurality of known error messages further cause the one or more processors to perform operations comprising:

generating a corresponding vector representation for each message thread; and executing a comparison between each corresponding vector representation and vector representations corresponding to the plurality of known error messages.

* * * * *